Feb. 8, 1955
E. JONES
2,701,549
HOPPER AND TROUGH FEEDING DEVICE FOR POULTRY
Filed Feb. 17, 1951
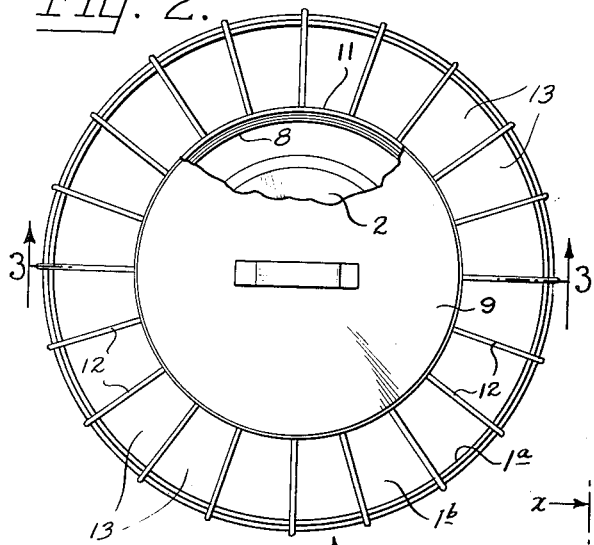
Fig. 2.
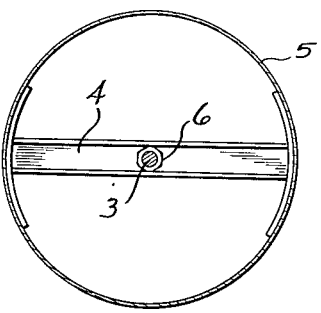
Fig. 4.
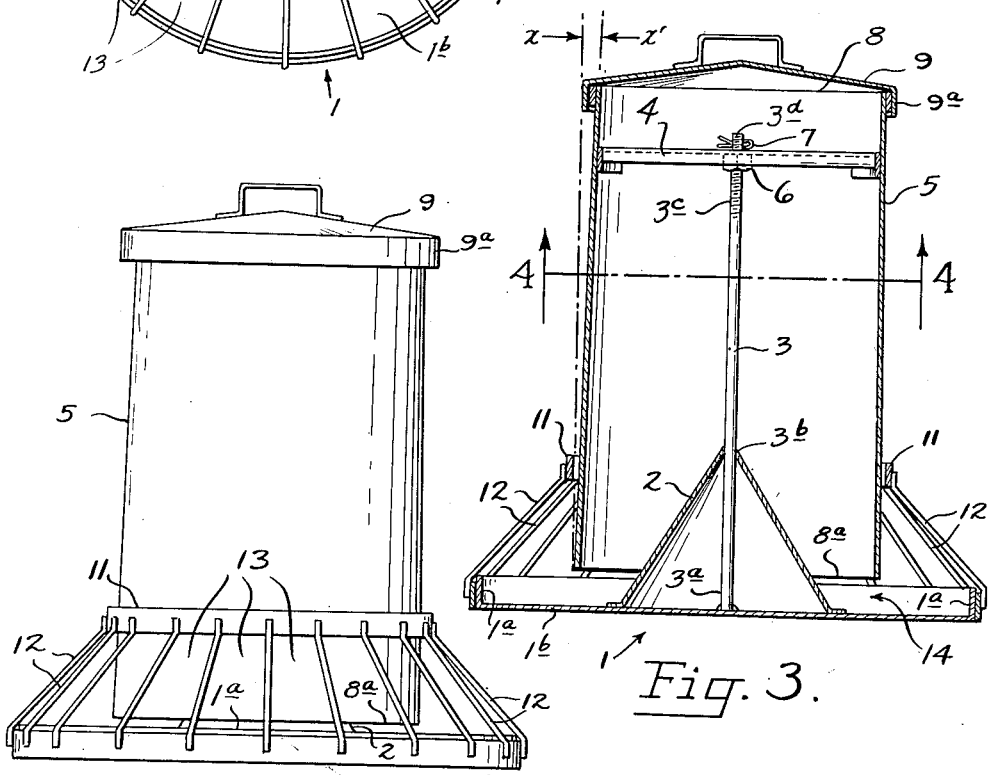
Fig. 1.
Fig. 3.
INVENTOR.
Eynon Jones
BY
Atty.

United States Patent Office 2,701,549
Patented Feb. 8, 1955

2,701,549

HOPPER AND TROUGH FEEDING DEVICE FOR POULTRY

Eynon Jones, Tigard, Oreg., assignor to L. G. Traylor, Medford, Oreg.

Application February 17, 1951, Serial No. 211,490

1 Claim. (Cl. 119—52)

My invention relates to feeding devices for poultry, and has for its principal object the provision of an automatic feeding device, which holds a substantial quantity of feed and automatically discharges it into a feeding tray, without waste.

A further and more specific object of my invention is to provide a poultry feeding device which is of circular form, and the tray which it supplies is likewise of circular form and is provided with a plurality of feeding stations spaced radially about the feeder. My observation has been that the usual feeding device is in the form of an elongated trough, is poorly designed because a bird's head is much smaller than its body, and a lineal trough is not efficient to permit the maximum number of birds to stand and feed at one time. If more than an optimum number tend to feed at one time, they crowd each other and small chicks become trampled upon. Another factor is that if they are crowded, they tend to climb into the feeding tray or stand thereon and soil the feed so that it is not palatable and must be thrown away.

A further object of my invention is to provide a feeding device which has a hopper of substantial capacity, said hopper being constructed and arranged to cause the feed to flow uniformly therethrough without stacking up or wedging or otherwise failing to flow smoothly to the feeding tray. This problem is particularly acute in feeding extremely fine meal and the problem is intensified if said meal becomes moist. The fineness of the meal and any moisture absorbed therein tends to cause it to pack and wedge within the hopper. Thus, it either fails to flow to the feeding trays or else large quantities break away periodically and fall down into the tray to cause them to overflow.

This latter problem is solved by making the walls of the hopper diverging downwardly and thus the underline layers will tend to fall away and not arch or bridge over because they have no frictional engagement with the walls of the hopper as is the case if the walls are vertical or taper inwardly. A further factor in eliminating this difficulty is to make the hopper rotatable and pendent upon a pair of supports arranged near the top with an enveloping band near the bottom in which said hopper bears loosely so that some vibration may be provided as birds brush against it as the wind or elements tend to cause it to move slightly. The vibration thus produced tends to inhibit arching over and wedging.

A further object of my invention is to provide a feeding device with a central conic baffle so that feed flowing downwardly into said hopper is diverted laterally at the bottom and directed into the feeding tray which lies below and radially outwardly from the open bottom of the hopper.

A further object of my invention is to provide a feeding device which has no substantial obstructions to flow of feed to the feeding tray. This is accomplished by making the bottom of the hopper entirely open and thus no intervening stationary members interrupt flow from the hopper to the feeding tray except the central conic diverter which directs the flow laterally outwardly.

A further object of my invention is to provide means for varying the width of said discharge opening so as to regulate flow therefrom, and thus the quantity of feed which flows from the hopper to the feed tray.

A further object of my invention is to provide a feeding device with a hopper in which the surfaces of the feed are smooth.

Further and other details of my invention are hereinafter described with reference to the accompanying drawings, in which:

Fig. 1 is an elevation of a feeding device embodying my invention;

Fig. 2 is a plan view thereof with a portion of the removable cover shown broken away to disclose details of the tubular hopper upon which said cover is mounted;

Fig. 3 is a longitudinal section taken on the line 3—3 in Fig. 2; and

Fig. 4 is a cross sectional view taken on the line 4—4 in Fig. 3 looking upwardly in the hopper toward the member or spider which supports the upper end of the stem.

A poultry feeding device embodying my invention comprises a cup-shaped base 1 which is rather shallow and terminates in an upturned rim portion 1a. The remainder of said base is relatively flat and defines a plane floor 1b. Arranged centrally of said floor is a conic central baffle or deflector portion 2. This conic portion has a base which occupies slightly less than one-half of the width of said floor, is arranged concentrically therewith, and is inclined sharply upwardly. Arranged axially of said conic portion and secured to the floor is a stem 3. This is welded or otherwise secured to the floor at its lower end 3a and welded or otherwise secured at 3b to the apex of the conic portion 2. Because of the steepness of the slope of the peripheral surface of conic section, said points 3a and 3b are quite widely spaced and said points of joinder thus tend to prevent said stem from tilting. The stem preferably extends normal to the plane of the floor 1b and if said plane rests upon a horizontal surface, said stem extends vertically.

The upper end 3c of said stem is screw threaded. A transverse member or spider 4 is carried by said threaded end and the ends of said transverse member are welded or otherwise secured to a tubular body or holder 5 constituting the feed storage bin of my device. Said tubular holder 5 may be adjusted towards and from said base by the screw-threaded end 3c. The member or spider 4 carries a nut 6 which engages the threads 3c. A cotter key 7 or other device constituting a stop is preferably provided at the upper end 3d of the stem so as to limit the upward travel of the nut on its screw threads and thus this limits the upward movement of the tubular member by this adjusting means.

Said tubular holder is open at both its upper end 8 and its lower end 8a. The upper end is preferably shielded by a removable cover 9 preferably provided with a pendent skirt 9a which encompasses the periphery of said holder about said open end. Thus, said cover fits tightly over said upper end 8 so as to remain in place and prevent any moisture or foreign matter from entering the bore of said tubular holder. The bore of said holder constitutes a storage bin for poultry feed. Said holder preferably is of substantial height and diameter so that it may receive and hold a large amount of poultry food. The lower end 8a of said tubular holder may be spaced from the plane of the floor by rotating said holder thus to cause the nut 6 to climb upon the screw-threaded end 3c of the stem 3. Its upper limit is indicated in Fig. 3 and at said upper limit the lower end 8a preferably lies substantially in the horizontal plane of the upper rim portion 1a of the base. Thus, the flow of poultry feed from said tubular holder into the base is limited by the proximity of the lower end of the tubular holder and only that portion will spill laterally therefrom as will be urged by the static pressure of the comminuted poultry feed in the tubular holder or bin.

The feeding tray is that portion of the base 1 lying exteriorly of the toe or periphery of the conic portion 2 and the inner face of the rim portion 1a. The tubular holder has a diameter which coincides more or less with the peripheral diameter of the feeding tray. The depth of said feeding tray and the width thereof are related to the spacing of the lower portion of the tubular member from the floor and the slope of the conic portion. That is to say, the conic portion or deflector 2 has a pitch which exceeds the angle of repose of the poultry food in the tubular holder 5 and, as it moves down said holder and is pushed laterally by the conic deflector, it passes under the lower end 8a of said tubular holder and flows out into the feeding tray 10 which underlies and extends laterally beyond said lower end. Further flow along said tray is limited by the rim portion 1a. Thus, at all times, there is a relatively shallow annulus of poultry food lying in said tray which is replenished as it becomes depleted by the poultry feeding.

Types of poultry feed vary from extremely fine meal to relatively coarse grit or cut forage. Thus, the lower end of the holder must be spaced from the floor a distance to accommodate an adequate flow from the holder. This may be accommodated by threading the nut upwardly on the stem until it moves to a proper degree past the said lower end 8a and out into the feeding tray 10. The rate of flow and quantity of discharge for a batch of foodstuff thus is more or less constant and one setting is all that is necessary for feeding a lot of poultry food in the housing.

One of the economic factors in raising poultry is the time and labor involved in feeding them. It is recognized as desirable that a constant supply of foodstuff should be available, that said foodstuff should be kept clean and palatable, and the price thereof requires that little or none be wasted. To this end, holders embodying my invention are of substantial capacity and height. For example, it is common to provide a holder which will supply a day's foodstuff to a flock of chickens. In a relatively shallow holder, the problem of wedging or arching is not too great a problem. That is to say, if only a small quantity of foodstuff is to be caused to flow from the holder down into the feeding tray, no great concern must be maintained to cause it to flow without interruption and in adequate amounts. When large quantities are provided under substantial static head, and particularly where poultry food is used which is ground quite finely, or if it becomes moist from the absorbed moisture in the air, it tends to wedge and arch over, and thus to interrupt flow. To prevent this from happening, I cause said tubular member to be frusto-conic in section. That is to say, the base of said tubular holder is slightly larger in diameter than the top portion thereof. By way of example, one model of poultry feeding devices has an overall length of 29 inches, an upper diameter of 16 inches, and a lower diameter of 17 inches. In this model, the side walls of said tubular holder flare outwardly about one inch in diameter from top to bottom and said flare is preferably at a uniform angle of divergence. I have observed that, as the poultry feed moves downwardly in the tubular holder, even a slight degree of divergence tends to prevent the foodstuff from adhering to the bore of the holder and arching over, so as to jamb and prevent uninterrupted flow of the superimposed quantity of material downwardly through said holder.

To hold said tubular member 5 roughly in undistorted outline and substantially coaxial with the stem 3, I provide an encompassing band 11 which encircles the lower end of the holder 5. Said band is supported by a plurality of obliquely inclined braces 12, which are welded or otherwise secured to the rim portion 1a of the base 1. Said braces perform two additional functions besides supporting said band: (1) They provide a plurality of relatively narrow stalls 11 radially disposed with respect to the feeding tray 10, and (2) they serve to prevent poultry from standing in the feeding tray to soil the food therein and to prevent other feeding chicks from having ready access to the feeding tray.

Inasmuch as it has been my observation that poultry frequently close their eyes as they start to peck at food, I make said braces with circular section, such as a quarter inch round rod. Thus, no sharp edges are provided which might injure a chicken's head or comb. Chickens are somewhat cannibalistic in their nature. If a chicken's head or comb becomes injured and bleeds, other chickens will pick at it until the chicken is killed, unless it is discovered in time. The rounded, peripheral surfaces of said rods, and the absence of sharp corners or edges, tends to prevent the injuring of chickens in feeding. This has been my experience with feeding devices embodying my invention. In the drawings, and particularly in the model which I have described heretofore, I show twenty such braces thus defining a corresponding number of spaced stalls. They are about four inches apart, and this is sufficient to permit a chicken to feed readily but to keep its neighboring feeder spaced slightly from it. This is the "stall" effect which I have commented on previously. The relatively close spacing of said braces also serves to prevent chickens from standing in the trays. Physically, they can stand in the four inch space, but they cannot eat while thus standing in the tray, and the slope of the braces is such that it is quite uncomfortable. Thus, the provision of said braces and the spacing and arrangement thereof to prevent or discourage chickens from perching on, in, or over said feeding tray.

As the tubular holder is moved downwardly, to narrow the discharge opening between the lower end 8a of the holder and the floor 1b of the base, greater restriction is imposed to the flow of poultry feed from the holder. Because of the outward flare of the holder, the spacing between the encircling band 11 and a holder will increase. It might be assumed that this would produce some rattling which would be distracting to the chickens or other poultry using the feeding device. My experience has been that said foodstuff, flowing beneath said lower edge 8a and the conic portion 2, tends to prevent rattling. The slack between holder 5 and band 11 thus provided, proves useful. Inasmuch as the supply of poultry feed in the holder is supported adjacent its upper end by the transverse member or spider 4, the lower end is free to move except as it is cushioned by the foodstuff within the holder. Very slight movement and vibration caused either by contact of the feeding chickens or the elements tends to prevent any tendency of the foodstuff to lodge, stick, and arch over. This play is quite small, somewhere in the range of one-eighth to five-sixteenths of an inch, but it is sufficient to permit the jarring of the holder to aid in the prevention of arching over or interruption of flow of food to the feeding tray.

I claim:

A poultry feeding device, comprising a circular, cup-shaped base member having a floor and an upturned encompassing peripheral rim, a conic baffle member secured to and projecting upwardly from the center of said floor, an elongated stem member mounted at the lower end thereof upon said floor and extending axially up through and beyond the apex of said conic baffle, a laterally extending spider member rotatably mounted upon the upper end of said elongated stem member, screw thread means interconnecting said spider and stem rotatably to adjust the vertical position of said spider upon said stem, stop means upon the upper terminal end of said stem for limiting vertical movement of said spider relative to said stem, an elongated, hollow, frusto-conic body member having a smaller diametered upper portion mounted upon said laterally extending spider and a larger diametered lower portion depending therefrom and terminating adjacent but within the peripheral outline of said circular base member, the major upper portion of said stem member being free of bracing to accommodate limited lateral movement of said upper portion, said spider and said frusto-conic body member relative to said base member and said conic baffle, an annular guide ring means upstanding from and fixed to the peripheral rim of said base member and encompassing the lower portion of said frusto-conic body member, said guide ring means being of greater girth than the lower portion of said body member and being spaced radially out therefrom to limit said lateral movement of the body member in definition of an abutment stop which said larger diametered lower portion will contact at the extremities of said limited lateral movement.

References Cited in the file of this patent

UNITED STATES PATENTS

| Number | Name | Date |
|---|---|---|
| 1,131,491 | Drake | Mar. 9, 1915 |
| 2,417,484 | Gifford et al. | Mar. 18, 1947 |
| 2,438,080 | Van Meeteren | Mar. 16, 1948 |
| 2,496,828 | Throckmorton | Feb. 7, 1950 |
| 2,515,698 | Cosby | July 18, 1950 |
| 2,522,634 | Pittenger | Sept. 19, 1950 |